United States Patent
Woo et al.

(10) Patent No.: US 12,480,543 B2
(45) Date of Patent: Nov. 25, 2025

(54) BEARING DEVICE FOR VEHICLE

(71) Applicants: HYUNDAI MOTOR COMPANY, Seoul (KR); KIA CORPORATION, Seoul (KR); HYUNDAI TRANSYS INC., Seosan-si (KR)

(72) Inventors: Jung Hoon Woo, Suwon-si (KR); Dae Hee Lee, Incheon (KR); Hong Sik Chang, Hwaseong-si (KR); Jin Suk Seo, Seoul (KR); Hye Kyung Kim, Suwon-si (KR); Kwan Woo Lee, Suwon-si (KR); Jin Wook Choi, Hwaseong-si (KR); Eom Seok Yoo, Hwaseong-si (KR); In Gul Baek, Hwaseong-si (KR); Ki Young Yun, Yongin-si (KR); Yong Seong Jang, Incheon (KR); Chan Ju Kim, Gunpo-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 234 days.

(21) Appl. No.: 18/224,776

(22) Filed: Jul. 21, 2023

(65) Prior Publication Data

US 2024/0367565 A1 Nov. 7, 2024

(30) Foreign Application Priority Data

May 3, 2023 (KR) .......................... 10-2023-0057647

(51) Int. Cl.
*F16C 29/02* (2006.01)
*F16C 29/00* (2006.01)
*B60N 2/75* (2018.01)

(52) U.S. Cl.
CPC ............ *F16C 29/002* (2013.01); *F16C 29/02* (2013.01); *B60N 2/773* (2018.02)

(58) Field of Classification Search
CPC ......... F16C 29/002; F16C 29/02; B60N 2/773
See application file for complete search history.

(56) References Cited

U.S. PATENT DOCUMENTS

| 4,652,146 A * | 3/1987 | Ellermann | F16C 29/02 384/39 |
| 2010/0226080 A1* | 9/2010 | Tsuchida | F16C 29/02 384/42 |

(Continued)

FOREIGN PATENT DOCUMENTS

KR 2004-0098364 A 11/2004

*Primary Examiner* — Alan B Waits
(74) *Attorney, Agent, or Firm* — MCDONNELL BOEHNEN HULBERT & BERGHOFF LLP

(57) ABSTRACT

A bearing device for a vehicle includes a main body unit mounted on a mounting region in a rail structure configured so that the mounting region is formed on a first rail that is any one of two rails rail-coupled to slide and the first rail slides along a second rail, a first shape unit provided to protrude from an upper surface of the main body unit and be in contact with the second rail and formed to damp a vibration in a first direction transmitted to the main body unit, and a second shape unit provided to protrude from a side surface of the main body unit and be in contact with the second rail and formed to damp a vibration in a second direction transmitted to the main body unit.

11 Claims, 8 Drawing Sheets

(56) References Cited

U.S. PATENT DOCUMENTS

| | | | |
|---|---|---|---|
| 2017/0175811 A1* | 6/2017 | Zimmermann | A47B 88/497 |
| 2019/0017548 A1* | 1/2019 | Jindra | F16C 29/02 |
| 2023/0313834 A1* | 10/2023 | Ma | F16C 17/12 |
| | | | 384/91 |
| 2024/0384582 A1* | 11/2024 | Kim | F16C 29/123 |

* cited by examiner

VIEW A

BEARING DEVICE FOR VEHICLE

CROSS REFERENCE TO RELATED APPLICATIONS

This application claims under 35 U.S.C. § 119 (a) the benefit of priority to Korean Patent Application No. 10-2023-0057647 filed on May 3, 2023, the entire contents of which are incorporated herein by reference.

BACKGROUND

(a) Technical Field

The present disclosure relates to a bearing device for a vehicle, and more specifically, to a bearing device for a vehicle capable of reducing vibrations transmitted through a bearing by improving a clearance between a moving rail and the bearing and reducing the number of assembly processes of the bearing to be mounted to the moving rail.

(b) Background Art

In general, consoles for a vehicle are structures installed between a driver's seat and a front passenger's seat in a vehicle interior and used as a storage place for storing objects used by a driver and passengers during traveling.

In addition to the use of storing the objects, such a console is also used for raising the driver's arm to reduce the driver's fatigue due to driving during long-time driving.

To this end, conventional consoles for a vehicle are formed in the form of a box with an open upper portion and composed of a console body coupled to a bottom surface between the driver's seat and the passenger's seat, a cover member hinge-coupled to one side of an upper end of the console body to cover the open upper portion of the console body, etc.

Here, the console body is formed in the form of a box with an open upper portion and has a storage space capable of storing objects.

In addition, the cover member is hinge-coupled to the one side of the upper end of the console body to function to open and close the open upper portion of the console body and at the same time, function as an armrest capable of allowing the driver to comfortably raise the arm in a state of shielding the upper portion of the console body.

In particular, the cover member may be mounted to slidably move from the console body to selectively slide according to a position of the driver's arm.

However, in the case of the bearing provided for the slide movement of the cover member as described above, a gap inevitably occurs in a process of being assembled to the moving rail, and to this end, additional components may be included, but a problem that the number of assembly processes and components increase inevitably occurs.

In addition, as the gap occurs, when vibrations of a vehicle body are transmitted through the console body and the moving rail toward the cover member, the vibrations are inevitably transmitted to the driver through the cover member, resulting in a problem of quality degradation, and in addition, a high operating force is generated due to the gap, resulting in a problem of lowering operation feeling.

SUMMARY

The present disclosure is directed to providing a bearing device for a vehicle, which may reduce a friction force through coating with a lubricant, thereby enabling a slide movement even with less force, and improve a clearance between a moving rail and a bearing by applying an elastic body to an upper surface and a side surface thereof, thereby reducing horizontal and vertical vibrations transmitted through a bearing and reducing the number of assembly processes of the bearing to be mounted to the moving rail through assembling by press-fitting.

A bearing device for a vehicle according to the present disclosure includes a main body unit mounted on a mounting region in a rail structure configured so that the mounting region is formed on a first rail that is any one of two rails rail-coupled to slide and the first rail slides along a second rail, a first shape unit provided to protrude from an upper surface of the main body unit and be in contact with the second rail and formed to damp a vibration in a first direction transmitted to the main body unit, and a second shape unit provided to protrude from a side surface of the main body unit and be in contact with the second rail and formed to damp a vibration in a second direction transmitted to the main body unit.

Here, the main body unit may include the first shape unit and the second shape unit and may be formed so that a surface in contact with the second rail is coated with a lubricant.

In addition, the first shape unit may be made of an elastic material, formed in an arch shape, and provided to be selectively compressed and deformed when a vibration in a vertical direction is generated.

In addition, the second shape unit may be made of an elastic material, formed in an arch shape, and provided to be selectively compressed and deformed when a vibration in a horizontal direction is generated.

In addition, the main body unit may include mounting members formed to be selectively expanded to correspond to lengths of the mounting regions in a width direction, and a bottom member configured to support a bottom surface of the mounting region and formed in contact with the second rail.

The mounting member may be made of an elastic material and guides the main body unit to be press-fitted into the mounting region through selective expansion according to spread.

In addition, the mounting members may include latching members formed to be bent from the main body unit and may be formed to protrude in a direction facing each other to correspond to shapes of the mounting regions.

In addition, the bottom member may include a guide member following a longitudinal direction and having a shape having an inclined front and rear to be separated from the second rail.

In addition, the bottom member may include a through-hole formed so that a lubricant applied to the second rail enters therethrough and configured to allow the lubricant to be selectively discharged to a contact surface with the second rail upon slide movement of the main body unit.

Meanwhile, the main body unit may have the first shape unit and the second shape unit integrally formed on an upper surface and a side surface thereof, and at least one main body unit may be coupled to the mounting region formed in a longitudinal direction of the first rail.

According to the present disclosure, by coating the surface of the bearing matched with the moving rail to generate friction with the lubricant, it is possible to provide soft operating feeling in the front-rear direction due to the decrease in the friction force.

In addition, according to the present disclosure, by applying the elastic body protruding to the upper surface and the side surface of the bearing and mounting the elastic body on the moving rail to overlap each other, it is possible to improve the clearance between the moving rail and the bearing, thereby reducing the horizontal and vertical vibrations transmitted through the bearing.

In addition, according to the present disclosure, in mounting the bearing, by performing assembling by press-fitting, it is possible to reduce the number of assembly processes of the bearing.

In addition, according to the present disclosure, by applying the pocket structure to the lower end of the bearing and applying the structure having a shape that is open in the front-rear direction of the bearing, it is possible to smoothly supply the applied lubricant to the bearing using the interfacial tension between the bearing and the moving rail.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
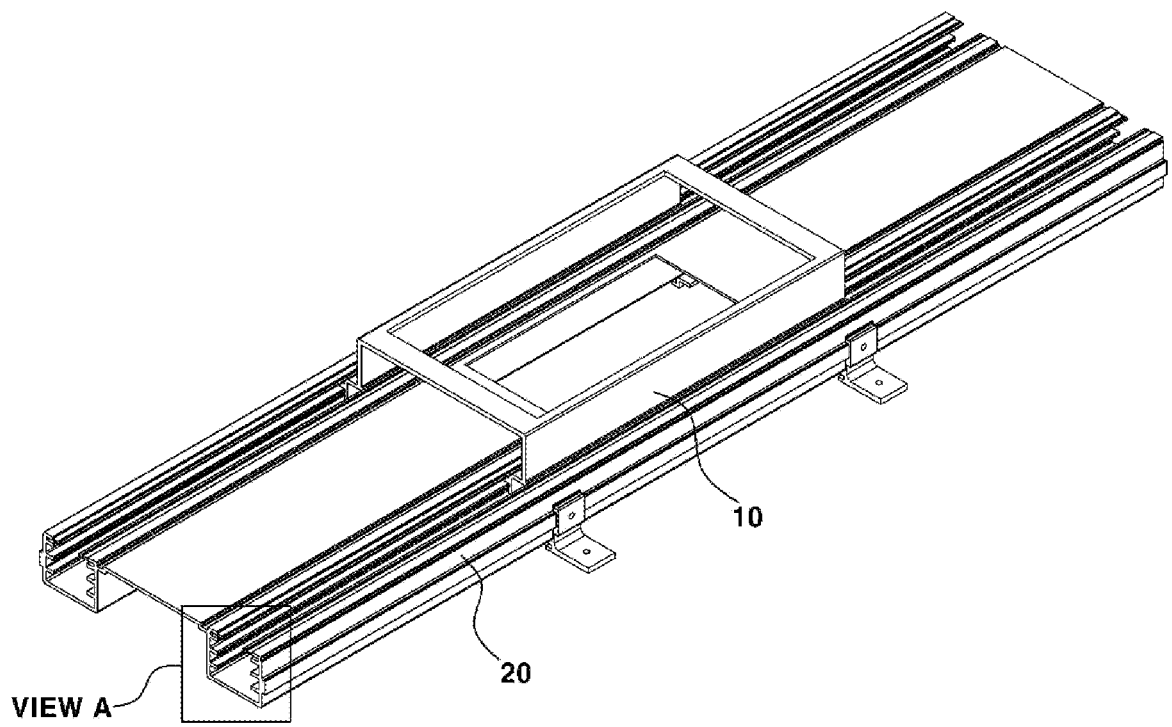
FIG. 1 is a view illustrating an operating state of a console equipped with a bearing device for a vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments according to the present disclosure will be described in detail with reference to the accompanying drawings.

Advantages and features of the present disclosure and methods for achieving them will become clear with reference to embodiments described below in detail in conjunction with the accompanying drawings.

However, the present disclosure is not limited to the embodiments disclosed below but will be implemented in various different forms, these embodiments are merely provided to make the disclosure of the present disclosure complete and fully inform those skilled in the art to which the present disclosure pertains completely of the scope of the present disclosure, and the present disclosure is only defined by the scope of the appended claims.

In addition, in the description of the present disclosure, when it is determined that related known technologies may obscure the gist of the present disclosure, a detailed description thereof will be omitted.

Figure 2:
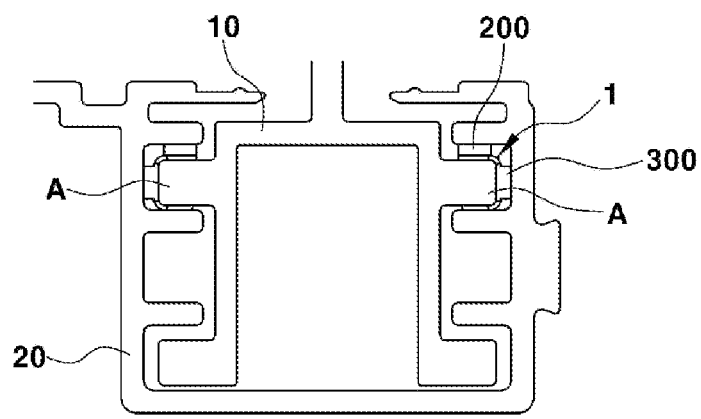
FIG. 2 is a view of region A in FIG. 1 illustrating a mounting state of the bearing device for a vehicle according to the embodiment of the present disclosure.

FIG. 1 is a view illustrating an operating state of a console equipped with a bearing device for a vehicle according to an embodiment of the present disclosure, and FIG. 2 is a view of region A in FIG. 1 illustrating a mounting state of the bearing device for a vehicle according to the embodiment of the present disclosure.

Figure 3:
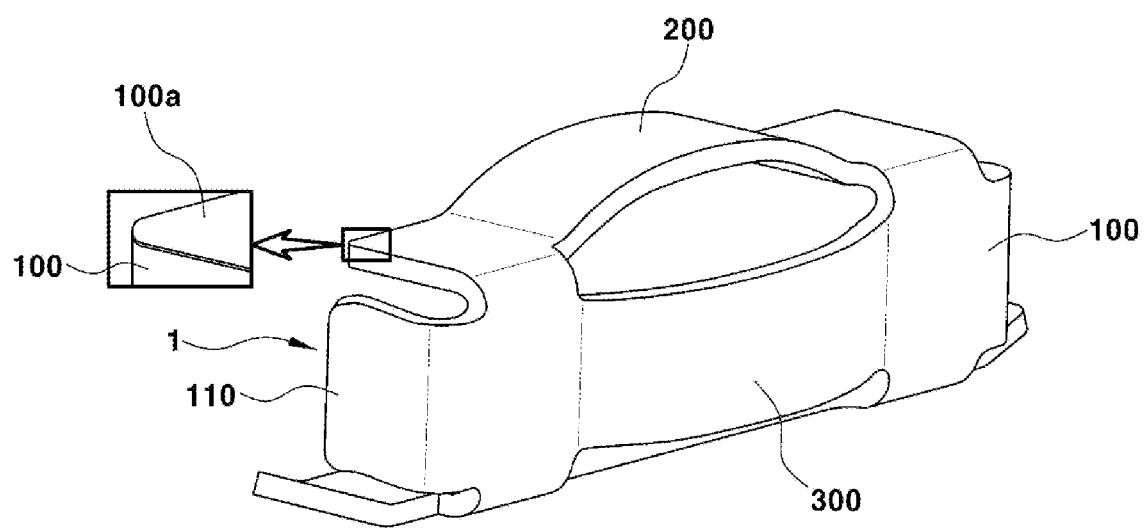
FIG. 3 is a view illustrating an outer shape of the bearing device for a vehicle according to the embodiment of the present disclosure.
Figure 4:
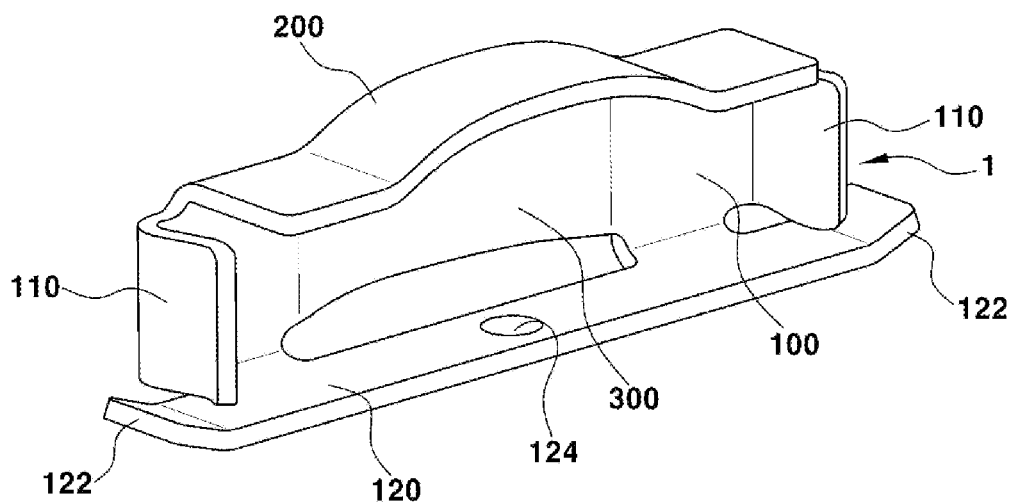
FIG. 4 is a view illustrating an inner shape of the bearing device for a vehicle according to the embodiment of the present disclosure.

In addition, FIG. 3 is a view illustrating an outer shape of the bearing device for a vehicle according to the embodiment of the present disclosure, and FIG. 4 is a view illustrating an inner shape of the bearing device for a vehicle according to the embodiment of the present disclosure.

Figure 5A:
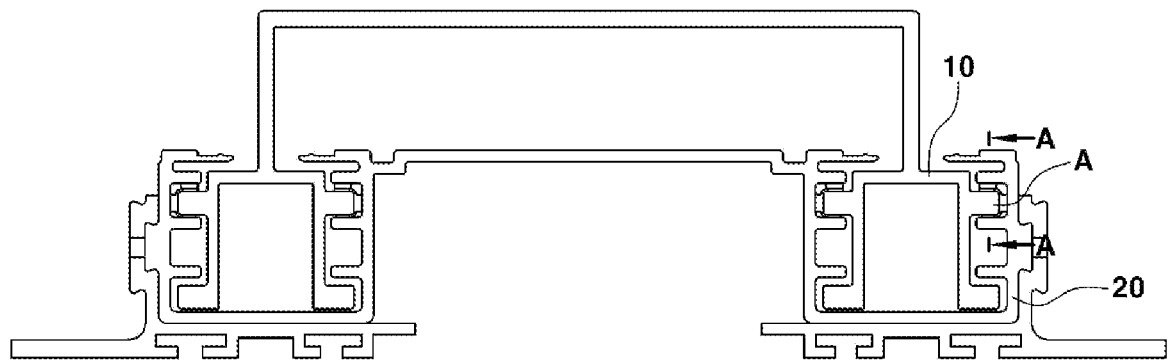
FIGS. 5A and 5B are views illustrating a mounting state of an upper surface of a main body unit of the bearing device for a vehicle according to the embodiment of the present disclosure.
Figure 5B:
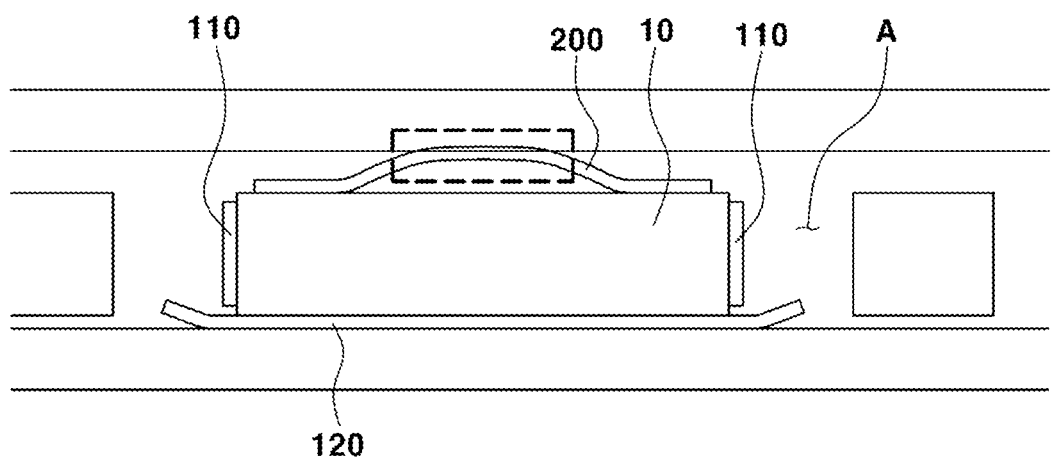
Figure 6A:
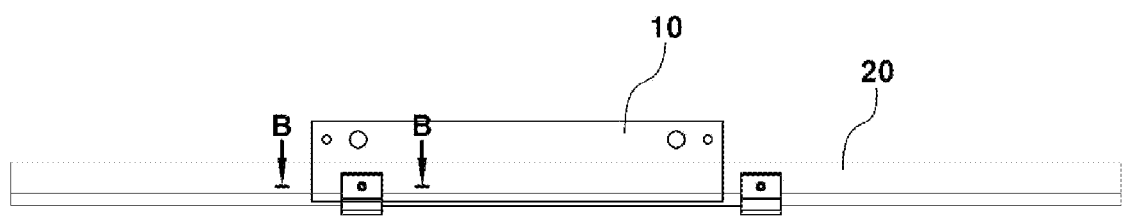
FIGS. 6A and 6B are views illustrating a mounting state of a side surface of the main body unit of the bearing device for a vehicle according to the embodiment of the present disclosure.
Figure 6B:
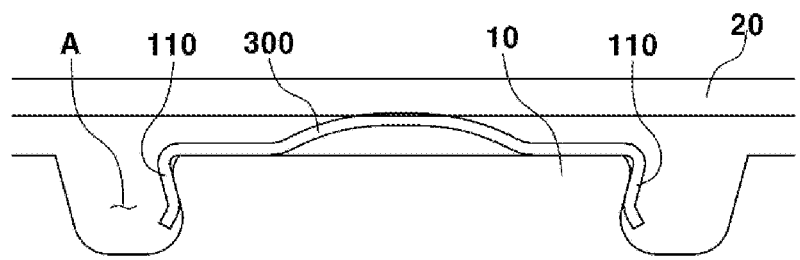
Figure 7:
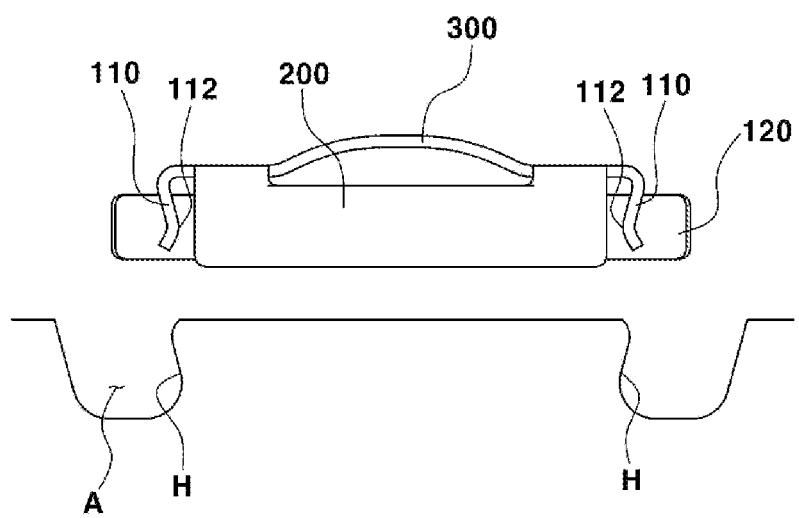
FIGS. 7, 8, and 9 are views sequentially illustrating a mounting process of the bearing device for a vehicle according to the embodiment of the present disclosure.
Figure 8:
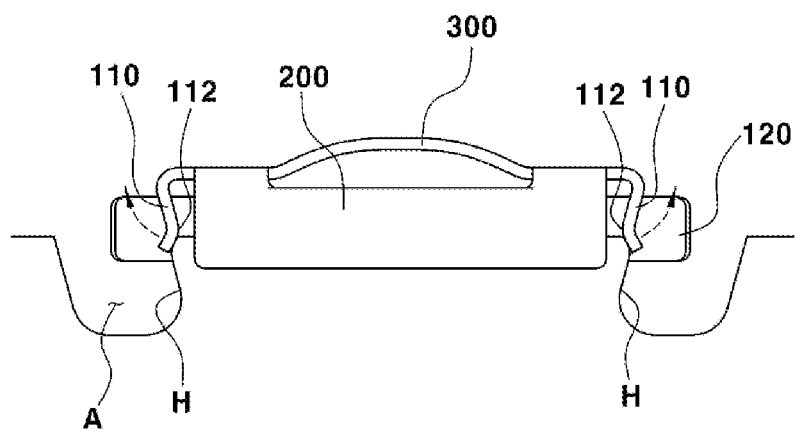
Figure 9:
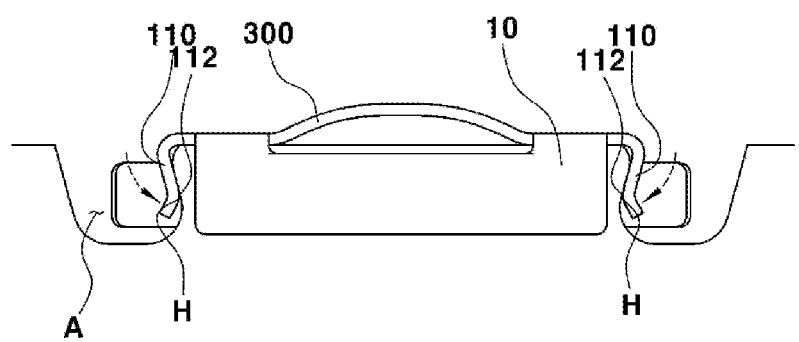
Figure 10:
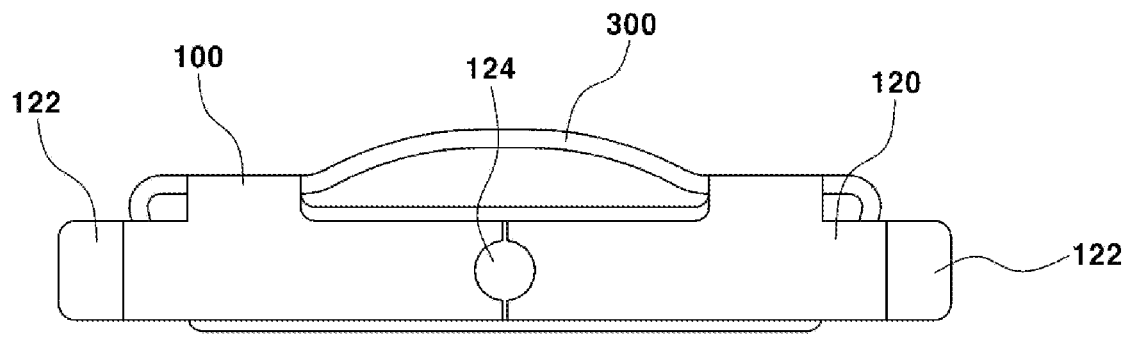
FIGS. 10 and 11 are views for showing a through hole and a guide member of the bearing device for a vehicle according to the embodiment of the present disclosure.
Figure 11:
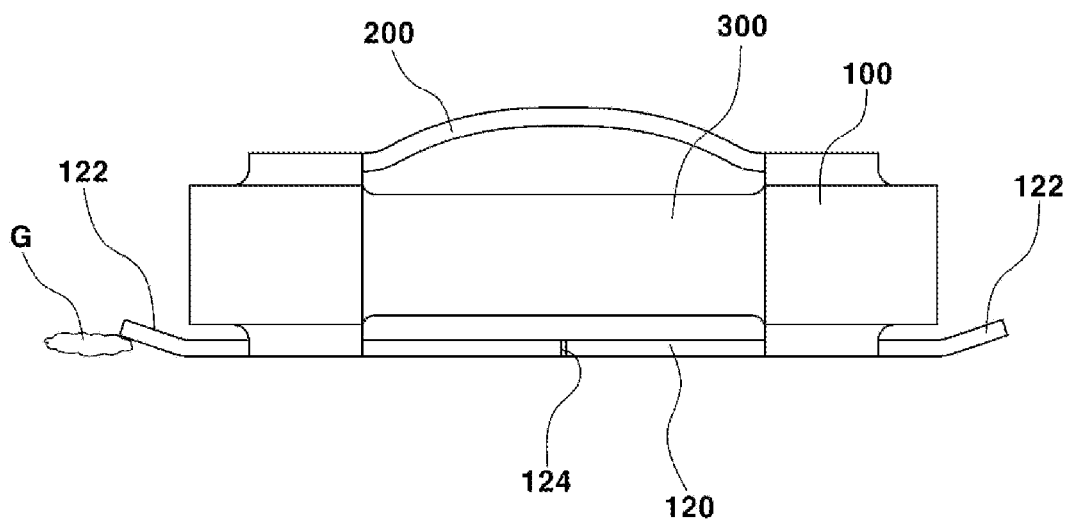

In addition, FIGS. 5A and 5B are views illustrating a mounting state of an upper surface of a main body unit of the bearing device for a vehicle according to the embodiment of the present disclosure, FIGS. 6A and 6B are views illustrating a mounting state of a side surface of the main body unit of the bearing device for a vehicle according to the embodiment of the present disclosure, FIGS. 7 to 9 are views sequentially illustrating a mounting process of the bearing device for a vehicle according to the embodiment of the present disclosure, and FIGS. 10 and 11 are views for showing a through hole and a guide member of the bearing device for a vehicle according to the embodiment of the present disclosure.

Figure 12:
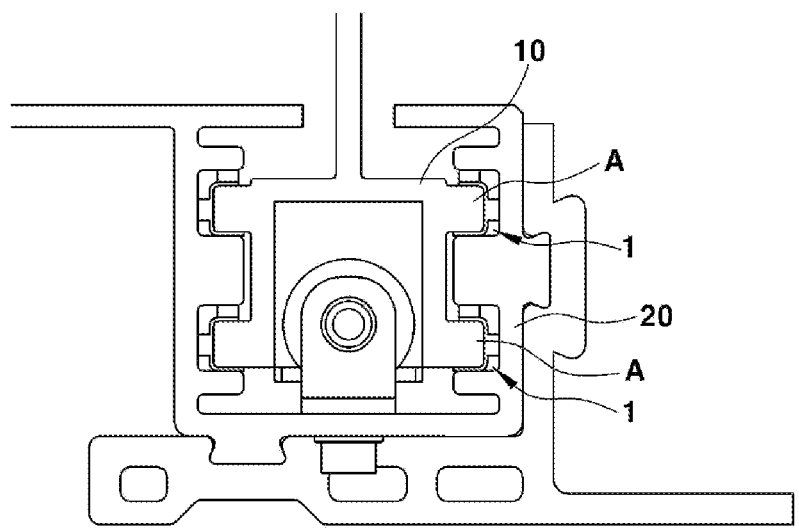
FIG. 12 is a view illustrating another example of a mounting state of the bearing device for a vehicle according to the embodiment of the present disclosure.
Figure 13:
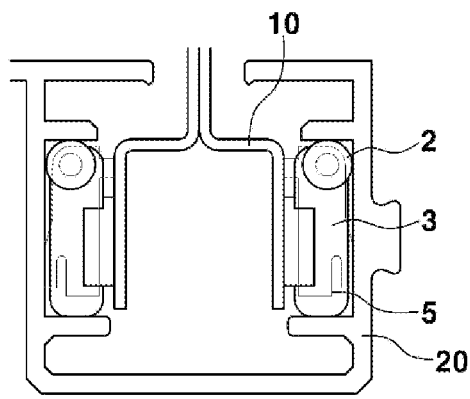
FIGS. 13 and 14 are views illustrating a conventional bearing device for a vehicle.
Figure 14:
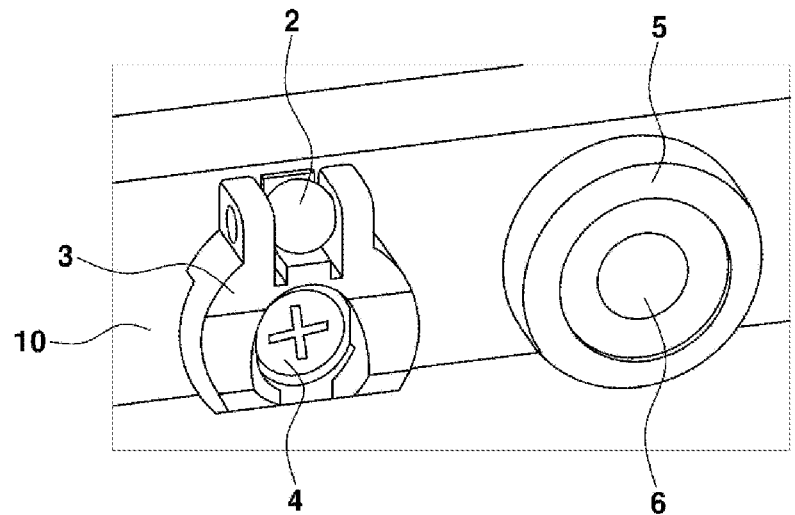

In addition, FIG. 12 is a view illustrating another example of a mounting state of the bearing device for a vehicle according to the embodiment of the present disclosure, and FIGS. 13 and 14 are views illustrating a conventional bearing device for a vehicle.

First, although not illustrated in the drawings, for example, a cover member constituting a general console for a vehicle functions to open and close an open upper portion of the console body and at the same time, functions as an armrest capable of allowing a driver to comfortably raise an arm in a state of shielding the upper portion of the console body, and in order to effectively function as the armrest, the cover member needs to be formed to slide to correspond to a position of the driver's arm.

To this end, for example, in a state in which a bearing device 1 is coupled to a first rail 10 corresponding to an upper rail, as illustrated in FIG. 1, as the first rail 10 slides in a longitudinal direction of the other rail fixedly disposed, for example, a second rail 20 corresponding a lower rail, the cover member may slide in a front-rear direction.

However, in the case of a conventional bearing device, as illustrated in FIG. 13, a steel ball 2 generating friction with the second rail 20 formed of an aluminum extrusion rail or a steel press rail is applied, and a predetermined gap inevitably occurs between the steel ball 2 and the second rail 20 for rolling operation and assembly, and thus when vibrations of a vehicle body are generated, the vibrations may be transmitted to the cover member due to the gap and finally directed to the driver, thereby degrading emotional quality.

In addition, as the gap occurs between the steel ball 2 and the second rail 20 as described above, operation feeling when the cover member slides is inevitably reduced due to a clearance or the like.

In addition, as illustrated in FIG. 14, in the conventional bearing device, a ball retainer 3 to be mounted to the steel ball 2 needs to be assembled to the first rail 10 through a screw 4, and after a ball bearing 5 is mounted therein, an assembly may be completed through riveting using a rivet 6.

However, in this assembly process, as a plurality of components, more specifically, the steel ball 2, the ball retainer 3, the screw, the ball bearing 5, the rivet 6, etc. need to be coupled, a problem of increasing the number of components inevitably occurs, and as a result, a problem of excessive assembly process for coupling the plurality of components also inevitably occurs.

In order to solve the above problems, as illustrated in FIGS. 3 and 4, a bearing device 1 for a vehicle according to the embodiment may include a main body unit 100, a first shape unit 200, and a second shape unit 300.

The main body unit 100 is mounted in a mounting region A in a rail structure configured so that the mounting region A is formed in the first rail 10 that is any one of two rails rail-coupled to slide and the first rail 10 slides along a second rail 20.

That is, the main body unit 100 may be mounted on any one rail in a structure in which a pair of rails is coupled, that is, any one in which the mounting region A is mounted of the first rail 10 corresponding to, for example, the upper rail and the second rail 20 corresponding to, for example, the lower rail as described above. More preferably, in the embodiment, the main body unit 100 has been described as being mounted to the mounting region A of the first rail 10 rail-coupled to the fixed second rail 20, but when the mounting region A is formed on the second rail 20, the main body unit 100 may also be mounted on the second rail 20.

In addition, as described above, the main body unit 100 may be mounted on the first rail 10 coupled so that the cover member constituting a general console may slide but this is not determined, but the present disclosure is not limited thereto and for example, may also be mounted on the first rail 10 coupled to a glove box provided for storage at a front passenger's seat of a vehicle, and in addition, may also be applied to all rail coupling structures in a vehicle in which the sliding is possible through rail-coupling.

As illustrated in FIG. 2, the main body unit 100 may include a first shape unit 200, a second shape unit 300, a mounting member 110, a bottom member 120, etc. and may be provided in a shape that surrounds all of an upper surface, a lower surface, a front surface, a rear surface, and side surfaces of the mounting region A.

Preferably, the main body unit 100 includes the first shape unit 200, the second shape unit 300, the bottom member 120, etc. so that the first rail 10 easily makes a slide reciprocating movement in a front-rear direction of the second rail 20 in a state of being coupled to the first rail 10 and is formed to coat a surface in contact with the second rail 20 with a lubricant.

That is, since the main body unit 100 is made of steel, when the main body unit 100 slides in a state of being in contact with the second rail 20 made of the same steel or aluminum, thereby causing damage and deformation due to wear, and thus the main body unit 100 may be provided in a state in which a surface thereof is coated with the lubricant such as polytetrafluoroethylene (PTFE).

Therefore, as illustrated in FIG. 3, a lubricant layer 100a in which the surface of the main body unit 100 made of the steel material is coated with the lubricant may be formed, and the lubricant layer 100a may reduce a friction force of a contact surface between the main body unit 100 and the second rail 20, thereby enabling easy slide movement even through a relatively less force.

The first shape unit 200 is provided to protrude from an upper surface of the main body unit 100 and be in contact with the second rail 20.

Here, the first shape unit 200 is formed to damp a vibration in a first direction, that is, in a vertical direction transmitted to the main body unit 100, and to this end, the first shape unit 200 may be made of an elastic material and as illustrated in FIGS. 5A and 5B illustrating a cross section along line A-A in FIG. 5A, may be formed in an arch shape so that the first shape unit 200 may damp the vibration while being selectively compressed and deformed when the vibration in the vertical direction corresponding to the first direction is generated.

In addition, the first shape unit 200 may be formed in a protruding arch shape having elasticity as described above to maintain the state of being in contact with the second rail 20, thereby preventing the gap from occurring between the upper surface of the main body unit 100 and the second rail 20 (see FIG. 5B), and thus it is possible to prevent the problem that the emotional quality is reduced due to the transmission of the vibrations to the driver like the conventional one.

The second shape unit 300 is provided to protrude from a side surface of the main body unit 100 and be in contact with the second rail 20.

The second shape unit 300 is formed to damp a vibration in a second direction, that is, in a horizontal direction transmitted to the main body unit 100, and to this end, the second shape unit 300 may be made of the same elastic material as the first shape unit 200, and as illustrated in FIGS. 6A and 6B illustrating a cross section along line B-B in FIG. 6A, may be formed in an arch shape so that the second shape unit 300 may damp the vibration while being selectively compressed and deformed when the vibration in the horizontal direction corresponding to the second direction is generated.

Likewise, the second shape unit 300 may be formed in a protruding arch shape having elasticity as described above to maintain the state of being in contact with the second rail 20, thereby preventing the gap from occurring between the side surface of the main body unit 100 and the second rail 20 (see FIG. 6B), and thus it is possible to prevent the problem that the emotional quality is reduced due to the transmission of the vibrations to the driver like the conventional one.

Preferably, in the embodiment, although it has been described that the damping is performed in the first and second directions while the first shape unit 200 and the second shape unit 300 are compressed and deformed when the vibration in a 90-degree direction, that is, in the vertical direction or the horizontal direction is generated, as the damping in the vertical and horizontal directions are complexly performed through the first shape unit 200 and the second shape unit 300, a damping in a diagonal direction that is a third direction may also be performed.

Meanwhile, the main body unit 100 includes the mounting member 110 and the bottom member 120.

The mounting members 110 are formed to be selectively expanded to correspond to lengths of the mounting regions A in a width direction.

To this end, the mounting member 110 is formed in a front-rear direction of the main body unit 100, is made of an elastic material, and guides the main body unit 100 to be press-fitted and mounted to the mounting region A through selective expansion according to the spread of the gap.

Here, the mounting members 110 may be bent from the main body unit 100, and as illustrated in FIG. 9, latching members 112 protrude in a direction facing each other may be provided to correspond to the bent shapes of the mounting regions A.

That is, since latching grooves H of the mounting regions A are formed to have inclinations in the direction facing each other, by allowing the latching member 112 to be positioned to be latched to inner sides of the latching grooves H together with an elastic restoring force acted by the material when the main body unit 100 is mounted on the mounting regions A by expanding the mounting members 110, it is possible to prevent the main body unit 100 from being separated from the mounting region A upon sliding.

A process for mounting the main body unit 100 on the mounting region A will be sequentially described with reference to FIGS. 7 to 9 as follows.

In a state in which the main body unit 100 is positioned in the mounting region A of the first rail 10 as illustrated in FIG. 7, as illustrated in FIG. 8, when the mounting member 110 is rotated in a spreading direction to be in close contact with the mounting region A, the mounting member 110 may be press-fitted into the latching grooves H and the main body unit 100 may be mounted on the mounting region A, and as illustrated in FIG. 9, the latching members 112 are positioned to be latched to the inner sides of the latching grooves H, and at this time, as the elastic restoring force acts, a pressure is applied to the mounting region A, and thus it is possible to firmly fix the main body unit 100 to the mounting region A.

As described above, the bearing device 1 for a vehicle according to the embodiment may be mounted on the mounting region A through the above-described press-fitting method, thereby reducing the number of assembly processes required for mounting compared to the conventional one, and since the components of the plurality of bearing devices for slide movement of the first rail 10 are integrally formed, it is also possible to solve the problem that the problem that the number of components may inevitably increase as the steel ball 2, the ball retainer 3, the screw, the ball bearing 5, the rivet 6, etc. need to be coupled may inevitably occur (see FIG. 14).

Meanwhile, the bottom member 120 supports the bottom surface of the mounting region A and is formed in contact with the second rail 20.

The bottom member 120 includes a guide member 122 following a longitudinal direction and having a shape having an inclined front and rear to be separated from the second rail 20.

As illustrated in FIG. 11, when a lubricant G such as a grease is applied on the second rail 20 to reduce a friction force acting on the contact surface, it is possible to effectively reduce the friction force acting on the contact surface upon slide movement of the first rail 10 only when the lubricant G needs to enter the contact surface between the main body unit 100 and the second rail 20.

Therefore, the guide member 122 may be inclined upward from each of the front and rear of the bottom member 120 to guide the lubricant G to smoothly enter the contact surface between the bottom member 120 and the second rail 20 along the inclined surface of the guide member 122 upon slide movement of the first rail 10, thereby reducing the friction force acting on the contact surface and enabling easy slide movement even with a relatively less force.

In addition, the bottom member 120 may be formed so that the lubricant G applied to the second rail 20 enters and is stacked therein, and as illustrated in FIG. 10, may include a through-hole 124 for allowing the lubricant to be selectively discharged to the contact surface between the bottom member 120 and the second rail 20 upon slide movement of the first rail 10.

More specifically, when the first rail 10 reciprocately slides in a front-rear direction in a state in which the bottom member 120 and the second rail 20 are in contact with each other, due to the interfacial tension between the bottom member 120 and the second rail 20, the lubricant G entering the through-hole 124 and stacked in the previous slide movement process may be discharged to the outside and uniformly applied to the contact surface between the bottom member 120 and the second rail 20.

As a result, the configuration of the guide member 122 and the through-hole 124 may allow the lubricant G to smoothly enter the contact surface between the bottom member 120 and the second rail 20 to maintain the state of being coated with the lubricant, thereby effectively reducing the friction force acting on the contact surface and eventually enabling easy slide movement with a relatively less force.

Meanwhile, the main body unit 100 may have the first shape unit 200 and the second shape unit 300 integrally formed on the upper surface and the side surface thereof, and at least one main body unit 100 may be mounted on the mounting region A in the longitudinal direction of the first rail 10, and in addition, as illustrated in FIG. 12, the main body unit 100 may also be applied to the first rail 10 having the multi-stage mounting region A, for example, all of rail coupling structures in a vehicle for slide movement through the rail-coupling, such as a console and a glove box for a vehicle differently from each other.

According to the present disclosure, by coating the surface of the bearing matched with the moving rail to generate friction with the lubricant, it is possible to provide soft operating feeling in the front-rear direction due to the decrease in the friction force.

In addition, according to the present disclosure, by applying the elastic body protruding to the upper surface and the side surface of the bearing and mounting the elastic body on the moving rail to overlap each other, it is possible to improve the clearance between the moving rail and the bearing, thereby reducing the horizontal and vertical vibrations transmitted through the bearing.

In addition, according to the present disclosure, in mounting the bearing, by performing assembling by press-fitting, it is possible to reduce the number of assembly processes of the bearing.

In addition, according to the present disclosure, by applying the pocket structure to the lower end of the bearing and applying the structure having a shape that is open in the front-rear direction of the bearing, it is possible to smoothly supply the applied lubricant to the bearing using the interfacial tension between the bearing and the moving rail.

The present disclosure has been described above with reference to the embodiment(s) shown in the drawings, but it will be understood that this is only illustrative, and various modifications can be made from the present disclosure by those skilled in the art, and all or some of the above-described embodiment(s) may also be configured in selective combination thereof. Therefore, the true technical scope of the present disclosure should be determined by the technical spirit of the appended claims.

The invention claimed is:

1. A bearing device for a vehicle, comprising:
a main body unit mounted on a mounting region in a first rail;
a first shape unit protruding from an upper surface of the main body unit and in contact with a second rail coupled to the first rail, the first shape unit being configured to damp a vibration in a first direction transmitted to the main body unit; and
a second shape unit protruding from a side surface of the main body unit and in contact with the second rail, the second shape unit being configured to damp a vibration in a second direction transmitted to the main body unit;
wherein the main body unit includes a through-hole configured to allow the lubricant to be discharged to a contact surface with the second rail upon sliding movement of the main body unit.

2. The bearing device of claim 1, wherein the main body unit includes the first shape unit and the second shape unit, and wherein a surface of the main body unit in contact with the second rail is coated with a lubricant.

3. The bearing device of claim 1, wherein the first shape unit is formed in an arch shape, and is configured to be compressed and deformed when a vibration in a vertical direction is generated.

4. The bearing device of claim 3, wherein the first shape unit is made of an elastic material.

5. The bearing device of claim 1, wherein the second shape unit is made of an elastic material, formed in an arch shape, and configured to be compressed and deformed when a vibration in a horizontal direction is generated.

6. The bearing device of claim 1, wherein the main body unit includes:
a plurality of mounting members configured to be expanded to correspond to lengths of the mounting regions in a width direction; and
a bottom member configured to support a bottom surface of the mounting region and in contact with the second rail.

7. The bearing device of claim 6, wherein each of the plurality of mounting member is made of an elastic material and is configured to guide the main body unit to be press-fitted into the mounting region.

8. The bearing device of claim 6, wherein the plurality of mounting members each include latching members bent from the main body unit and protruding in a direction facing each other to correspond to shapes of the mounting regions.

9. The bearing device of claim 6, wherein the bottom member includes a guide member disposed in a longitudinal direction and having an inclined front and rear, and separated from the second rail.

10. The bearing device of claim 6, wherein the bottom member includes the through-hole formed so that a lubricant applied to the second rail enters through the through-hole.

11. The bearing device of claim 1, wherein the main body unit has the first shape unit and the second shape unit integrally formed on an upper surface and a side surface, and coupled to the mounting region formed in a longitudinal direction of the first rail.

* * * * *